2,902,410
PROCESS FOR THE 1,2-DEHYDROGENATION OF A STEROID WITH SEPTOMYXA

Adolph Weintraub, Brooklyn, N.Y., and Samuel H. Eppstein, Kalamazoo, and Peter D. Meister, Kalamazoo Township, Kalamazoo County, Mich., assignors to The Upjohn Company, Kalamazoo, Mich., a corporation of Michigan No Drawing. Application September 26, 1957
Serial No. 686,295

26 Claims. (Cl. 195—51)

The present invention relates to a novel process for the fermentative dehydrogenation of steroids, the oxidative scission of the C–17 side chain of steroids, or both, and the products resulting therefrom.

This application is a continuation-in-part of application S.N. 493,302, filed March 9, 1955, now abandoned.

The process of the present invention comprises subjecting a steroid to the action of a fungus of the genus Septomyxa. Dehydrogenation is thereby effected especially at the 1,2-position when the starting steroid is saturated at the 1- and 2-position carbon atoms. Of special interest for dehydrogenation are starting 3-oxygenated steroids having two hydrogen atoms at each of the 1- and 2-position carbon atoms. Degradation of the 17-side chain may also be effected to give 17-hydroxy and 17-keto steroids, especially from a starting 20-oxygenated steroid.

Whereas side chain degradation and concomitant ring cleavage have been observed with a variety of organisms, dehydrogenation in ring A and selective side chain degradation without ring cleavage has been observed with but a small number of organisms. Thus Fried et al., J. Am. Chem. Soc. 75, 5764–5 (1953), shows that Cylindrocarbon radicola fermentation of progesterone, 17α,21-dihydroxy-4-pregnene-3,20-dione, or testosterone produces 1-dehydrotestololactone with cleavage of the original D ring. In contradistinction thereto, the instant Septomyxa fermentation of steroids permits the D ring in a large measure to remain intact.

It is an object of the present invention to provide a Septomyxa fermentation method for the dehydrogenation of steroids, especially steroids saturated at the 1,2-position. Another object of the invention is the provision of a process for the production of 1-dehydro steroids. Another object of the invention is to provide a method for the degradation of the 17-side chain of steroids, especially 20-oxygenated steroids, by the action of a fungus of the genus Septomyxa. A further object of the invention is the provision of a process for the production of 17-hydroxy-steroids and 17-ketosteroids. Additional objects of this invention are the provision of new and useful 1-dehydro steroids. Other objects and uses of this invention will be apparent to those skilled in the art to which this invention pertains.

The production of 1-dehydro steroids is known, but heretofore it has entailed difficult chemical processing such as dibromination of a steroid to give the 2,4-dibromo compound, along with other isomers, which could then be dehydrohalogenated with pyridine to give a 1,4-dehydro steroid, Fieser and Fieser, Natural Products Related to Phenanthrene, ed. 3, page 264, Reinhold Publ. Co., N.Y., 1949, and Djerassi U.S. Patent 2,579,479 of December 25, 1951. By the present process, the 1-dehydro and 1,4-dehydro steroids can be made directly.

The instant process is useful to reintroduce the 1-dehydro function where, for example, it may have been destroyed by previous processing such as by yeast 1-dehydrogenase incubations, which converts 1-dehydroandrostene-3,17-dione to androstane-3β,17β-diol with saturation of the 1,2-position. Butenandt, Ber. 73:818 (1940). Heretofore, direct changes within this recognized group of 1-dehydro steroids have not been available because of lack of a suitable method of preparing 1-dehydro steroids, Dorfman and Ungar, Metabolism of Steroid Hormones, pages 86 and 93, Burgess Publ. Co., Minneapolis, Minn., 1953.

The method of the present invention is able to furnish a variety of products which are useful therapeutics per se as well as being useful as intermediates in the production of therapeutic products. The instantly produced 1-dehydro steroids as compared with the corresponding 1-saturated steroids commonly have a lower melting point and enhanced pharmacological activity. They are additionally valuable intermediates where it is desired to aromatize the A ring.

The starting compounds of the present invention are either amenable to dehydrogenation, especially at the 1,2-position, or degradation of the 17-side chain, or both. Dehydrogenation is of special interest in conjunction with steroids saturated at the 1,2-position. Dehydrogenation can be effected preferably upon such steroids which are 3-oxygenated, that is containing the 3-hydroxy, 3-ether, 3-ester, or 3-keto group, in which the 1,2,3-position carbon atoms may be represented as follows:

—$CH_2$—$CH_2$—CO—;
—$CH_2$—$CH_2$—CHOH—; and —$CH_2$—$CH(CH_3)$—CO—

Of special interest in conjunction with degradation of the 17-position side chain are 20-oxygenated starting steroids, preferably the 20-hydroxysteroids and 20-ketosteroids. The starting cyclopentanopolyhydrophenanthrene can possess other substituents, for example, keto groups or hydroxy groups in positions 3, 6, 7, 8, 11, 12, 14, 17 and 21, particularly in the 11-position, and can have double bonds in various positions especially in positions 4,5 and 7,20. The starting steroid can have various substituents elsewhere on the molecule without impairing the nature of the reaction upon the herein described active positions. Where the starting steroid is saturated in the 1,2-position, the steroid may be either degraded, in the 17-position side chain, to 17-hydroxy or 17-keto, or dehydrogenated at the 1,2-position to give a double bond at the 1,2-position, or both degraded at the side chain and dehydrogenated. Aromatic A ring steroids result from a starting 19-hydroxy, 19-aldehyde or 19-normethyl-3-keto-4-dehydro steroids. Representative starting materials include: 3α- and 3β-hydroxypregnane-20-one, 3α- and 3β-hydroxy-5-pregnene-20-one, 3α- and 3β-hydroxypregnane-11,20-dione, 3α,11α-, 3α11β-, 3β,11α- and 3β,11β-dihydroxypregnane-20-one, 11-dehydroprogesterone, 9α-fluoro-, 9α-chloro- or 9α-bromo-progesterone, 17α-methyldehydrocorticosterone, 17α-methyl-11-desoxycorticosterone, 17α-methylprogesterone, 12α-hydroxy progesterone, progesterone, 11-ketoprogesterone, 11α-hydroxyprogesterone, 11α-acetoxyprogesterone, 11β-hydroxyprogesterone, 14α-hydroxyprogesterone, 17α-hydroxyprogesterone, 14α,17α,21-trihydroxy-4-pregnene-3,20-dione, 14α,17α-dihydroxy-21-acetoxy-4-pregnene-3,20-dione, 11α,17α-dihydroxyprogesterone, 17α-hydroxy-11-ketoprogesterone, 3β,17α,20-allopregnanetriol, 17α,21-dihydroxy-4-pregnene, 3,20-dione, 21-dihydroxy-4-pregnene-3,11,20-trione, corticosterone (11β,21-dihydroxy-4-pregnene-3,20-dione), 11-desoxycorticosterone (21-hydroxy-4-pregnene-3,20-dione), cortisone (17α,21-dihydroxy-4-pregnene-3,11,20-trione), cortisone acetate (17α-hydroxy-21-acetoxy-4-pregnene-3,11,20-trione), hydroxycortisone (11β,17α,21-trihydroxy-4-pregnene-3,20-dione), 9α-chloro-, bromo- or fluoro-11β,17α,21-trihydroxy-4-pregnene-3,20-dione, 2-methyl-11β,17α,21-trihydroxy-4-pregnene-3,20-dione, 11α,17α,21-trihydroxy-4-pregnene-3,20-dione, 4-androstene-3,17-dione adrenosterone (4-androstene-3,11,17-trione), 11-ketotestosterone, 11α- and 11β-hydroxy - 17α - methyltestosterone, 17α-ethinyltestosterone, pregnane-3,11,20-trione, 17α - hydroxypregnane-3,11,20 - trione, 17α,21-dihydroxypregnane - 3,11,20-trione, pregnane-3,12,20-trione, pregnane - 3,20-dione, 17α-hydroxypregnane-3,20-dione, allopregnane-3,11,20-trione, allopregnane - 3,20 - dione, 3α - hydroxy - 5-pregnene-20-one, 3β-11α-dihydroxyallopregnane-20-one, 3α-and 3β-hydroxyallopregnane-20-one, androstrone (androstan-3α-ol-17-one), 3α,12α,21-trihydroxypregnane-20-one, testosterone, 19 - normethyltestosterone, 17α - methyltestosterone, 11β,21-dihydroxy-4,17(20)-pregnadiene-3-one, 2-methyl-11β,21 - dihydroxy - 4,17(20) - pregnadiene - 3-one, 21-hydroxy-4,17(20)-pregnadiene-3,11-dione, 11α,21-dihydroxy-4,17(20)-pregnadiene-3-one, 2-bromo-11β,21-dihydroxy-4,17(20) - pregnadiene-3-one, 17α-21-dihydroxy-4,9(11)-pregnadiene - 3,20 - dione, 17α,21-dihydroxy-4-pregnene-9:11-β - oxido - 3,20 - dione, 2-methyl-17α,21-dihydroxy-4,9(11)-pregnadiene-3,20-dione, 2 - methyl - 17α,21-dihydroxy-4-pregnene-9:11-β-oxido-3,20-dione, and 2-methyl-9α-chloro-, bromo-, or fluoro-11β,17α,21-trihydroxy-4-pregnene-3,20-dione. Either the free hydroxy steroids or their ester form can be used as starting steroid substrate. The resulting 1,2-dehydrogenation takes place in any event to produce the corresponding 1-dehydro analogue of the starting material, recovered as the free alcohol.

In the process of the present invention, the operational conditions and reaction procedure and details may be those already known in the art of steroid bioconversion as illustrated by the Murray et al. U.S. Patent 2,602,769, issued July 8, 1952, utilizing however the action of a species of fungus of the genera Septomyxa. The genus Septomyxa belongs to the class of Deuteromyces, Fungi Imperfecti, of the order Melanconiales, of the family Melanconiaceae. Among the species of the genus Septomyxa which are useful in the fermentation of steroids are *Septomyxa affinis, Septomyxa aesculi, Septomyxa corni, Septomyxa salicina*, and *Septomyxa tulasnei*. Typical strains suitable for the practice of the invention are the following:

*Septomyxa affinis* (Sherb.) Wr., ATCC 6737.
*Septomyxa affinis*, Centraalbureau voor Schimmelcultures at Baarn, Holland (strain from v. Eck and from Wollenweber).
*Septomyxa corni* Oud., Centraalbureau voor Schimmelcultures at Baarn, Holland (strain from v. Arx).
*Septomyxa affinis* (Sherb.) Wr., Quartermaster 40b.

The foregoing cultures are listed in current catalogs (e.g. ATCC 6737, ATCC 13414, ATCC 13425, ATCC 13416 and Quartermaster 40b) and are suitable for the practice of the invention. It is to be understood, however, that other Septomyxa strains of these species or the typical species mentioned above are suitable.

Culture of the fungi, for the purpose and practice of the present invention, is in or on a medium favorable to the development of the fungi. Solid media can be utilized, but the preferred media are those which permit quantity growth under aerobic conditions. Moist solid particulate media, such as bran, cereal grains, cereal grits, wood chips, shavings, sawdust, cornhusks, fibrous material, such as copra, chestnuts, or lupine seeds may be used. These can be extracted with alcohol, ether or other organic solvents, to remove objectionable contaminants and growth inhibitors prior to fermentation. The carriers can optionally contain added growth factors and nutrients and can be used in layers or trays with or without auxiliary aeration, in towers or in the vinegar process or under conditions of agitation as for example by tumbling in a rotating drum. Liquid media, illustratively brewer's wort, are well adapted to use under aerobic layer or more especially aerobic submerged fermentation conditions. Suitably the media should contain sources of available carbon, nitrogen and minerals although of course there can be significant growth and development under less than optimum conditions.

Available carbon can be from carbohydrates, starches, gelatinized starches, dextrin, sugars, molasses as of cane, beet and sorghum, glucose, fructose, mannose, gelactose, maltose, sucrose, lactose, pentoses, amino acids, peptones or proteins, the hexoses being preferred. Lower fatty acids, higher fatty acids, or fats are illustrative of other materials which provide assimilable carbon for the energy requirements of the fungi. Mixtures of various carbon sources are sometimes advantageous.

Nitrogen in assimilable form can be provided by soluble or insoluble vegetable or animal proteins, soybean meal, lactalbumin, casein, egg albumin, peptones, polypeptides, amino acids, acid amides, urea, ammonium salts, ammonia trapped on base exchange resins or on zeolites, ammonium chloride, nitrates, sodium nitrate, potassium nitrate, or morpholine. Whey, distillers' solubles, corn steep liquor, or yeast extract have been useful.

As mineral constituents the media or menstruum can contain, naturally present or added, available aluminum, calcium, chromium, cobalt, copper, gallium, iron, magnesium, molybdenum, potassium, scandium, uranium, and vanadium. Sulfur can be provided by sulfates, alkyl sulfonates, sulfoxylates, sulfamates, sulfinates, free sulfur, hyposulfite, persulfate, thiosulfate, methionine, cystine, cystein, thiamin, or biotin. Phosphorous, preferably pentavalent, suitably in a concentration at or about 0.001 to 0.07 molar and particularly at or about 0.015 to 0.02, can be present, suitably as ortho-, meta-, or pyrophosphates, salts or esters, phytin, phytic acid, phytates, glycerophosphates, sodium nucleinate, and/or corn steep liquor, casein, lecithin or ovovitellin. Boron, iodine and selenium in traces may be advantageous. Desirably boron, in the form of boric acid or sodium borate can be present or added especially after germination and early growth of the fungus.

Other accessory growth factors, vitamins, auxins and growth stimulants can be provided as needed or desired.

While solid or liquid media can be utilized, a liquid medium is preferred as it favors mycelial growth.

To guard against infection the fermentation medium can contain added antiseptic or antibiotic agents such as benzoates, sulfites, penicillin, or tetracycline.

Suspending or mycelial carriers such as filter earths, filter aids, finely divided cellulose, wood chips, bentonite, calcium carbonate, magnesium carbonate, or other suspendable solid matter, substances such as methyl cellulose, carboxymethyl cellulose, alginates or polyvinyl alcohol can be added to facilitate fermentation, aeration and filtration.

The selected species of fungus is grown on a medium suitably containing assimilable non-steroidal carbon, illustratively carbohydrates, such as dextrose; assimilable nitrogen, illustratively soluble or insoluble proteins, peptones or amino acids, and mineral constituents, illustratively sodium or ammonium phosphate and magnesium sulfate. The medium can desirably have a pH before inoculation of between about four to about seven though a higher or lower pH may be used. A pH of between about five and about six is preferred for the growth of Septomyxa. Inoculation of the fungi growth-supporting medium with the selected species of Septomyxa may be accomplished in any suitable manner. Septomyxa grow over a range from about twenty to about 38 degrees centigrade with a temperature between about twenty to 35 degrees centigrade preferred.

The development period of fungal growth required before the steroid to be fermented is exposed to the fungus does not appear to be critical, for example, the steroid can be added either before thermal or other sterilization of the medium, at the time of inoculating the medium with a selected Septomyxa species, or at sometime, for example, 24 or 48 hours later. The steroid to be fermented can be added at any suitable concentration although for practical reasons steroid substrate at a concentration of about or up to about 0.5 gram per liter or even 0.8 gram per liter of medium is satisfactory and two grams per liter is operative although higher concentration, depending on the particular steroid, can be used. The addition of steroid substrate to be fermented can be accomplished in any suitable manner especially so as to promote a large surface of contact of the steroid substrate with the fungus, such as by dispersing the steroid substrate, either alone with a dispersing agent, or in solution in an organic solvent by mixing or homogenizing a steroid substrate with a fungal medium to form a suspension or dispersion of the steroid. Either submerged or surface culture procedures can be used with facility, although submerged culture is preferred. Alternatively, steroid fermenting enzymes of a growth of the fungus can be separated from the fungus or medium, admixed with the steroid or a solution or dispersion thereof, and the mixture subjected to aerobic conditions to accomplish fermentation of the steroid.

The temperature during the period of fermentation of the steroid can be the same as that found suitable for fungal growth. It need be maintained only within such range as supports life, active growth, or the enzyme activity of the fungus.

While any form of aerobic incubation is satisfactory for the growth of the selected fungus and fermentation of the steroid substrate, the efficiency of steroid fermentation is related to aeration and agitation. Therefore, aeration is usually controlled, as by agitation and/or blowing air through the fermentation medium. Aeration can be effected by surface culture or under submerged fermentation conditions. Aerobic conditions include not only the use of air to introduce oxygen, but also other sources or mixtures containing oxygen in free or liberatable form. In using air as the aerating medium, a desirable rate of aeration is about four to twenty millimoles and particularly about nine to twelve millimoles of oxygen per hour per liter as determined by the method of Cooper, Fernstrom and Miller, Ind. Eng. Chem. 36, 504 (1944). Aeration is suitably modified by using superatmospheric or subatmospheric pressures, for example, thirty pounds per square inch or ten pounds per square inch absolute. Oxygen uptake can be facilitated by the presence of various agents such as ascorbic acid, glutamic acid, citric acid, lactic acid, tyrosine, or tryptophane. The pH may be controlled by addition of alkali or phosphoric acid. The addition of excess calcium carbonate to maintain a solid calcium carbonate residue has been found desirable.

The time required for the fermentation of steroid varies somewhat with the procedure. When the steroid substrate is present at the time of inoculation of the medium, periods of from eight to 72 hours may be used. However, when the steroid is added to the fungus, after substantial aerobic growth of the fungal organism, for example, after sixteen to 24 hours at optimum temperature, the conversion of steroid substrate begins immediately and high yields are obtained in from one to 72 hours, 24 hours being generally satisfactory.

After completion of the steroid fermentation, the resulting fermented steroid is recovered from the fermentation reaction mixture. An especially advantageous manner of recovering the fermented steroid involves extracting the fermentation reaction mixture, including the fermentation liquor and mycelia with a water-immiscible organic solvent for steroids, for example, methylene chloride, chloroform, carbon tetrachloride, ethylene chloride, trichloroethylene, ether, amyl acetate, benzene, and the like. The fermentation liquor and mycelium can be separated and then separately extracted with suitable solvents. Mycelium can be extracted with either water-miscible or water immiscible solvents, acetone being effective. The fermentation liquor, freed of mycelia can be extracted with water-immiscible solvents. The extracts can be combined, either before or after washing with an alkaline solution, illustratively sodium bicarbonate, suitably dried, as for example, over anhydrous sodium sulfate, and the resulting purified fermented steroid obtained by recrystallization from organic solvents, by trituration with organic solvents or by chromatography in order to isolate the thus obtained steroids from the other fermentation products.

The following examples are illustrative of the process of the present invention and are not to be construed as limiting.

EXAMPLE 1

*Progesterone*

Twelve liters of medium consisting of one percent Cerelose dextrose, two percent cornsteep liquor of sixty percent solids, was adjusted to pH 4.9 with sodium hydroxide. Ten milliliters of lard oil containing 0.1 to 2.0 percent octadecanol was added to prevent foaming. The medium was steam sterilized at fifteen pounds pressure for thirty minutes. Upon cooling, the sterile medium was inoculated with a 24-hour growth, from spores, of *Septomyxa affinis* ATCC 6737. The medium was agitated, and sparged with sterile air at the rate of one liter of air per minute. After culturing at room temperature for 24 hours, the pH was 7.35. To this 24-hour culture there was added six grams of progesterone dissolved in 130 milliliters of acetone. Fermentation of the progesterone was maintained for 24 hours, at which time the pH was 8.1. The fermentation broth was strained through gauze to separate the mycelium. The mycelium was washed once with one liter of acetone and then twice with one-liter portions of methylene chloride. The acetone and methylene chloride washings were combined with an additional four liters of methylene chloride and this seven liters of extract and solvent was then used to extract the filtered beer. Upon separation of the extract from the beer, the beer was twice more extracted with three-liter volumes of methylene chloride. All of the acetone and methylene chloride extracts were combined and washed with 1200 milliliters of two percent sodium bicarbonate solution, and then with 1200 milliliters of water. The washed solvent extract was then dried with anhydrous sodium sulfate and vacuum evaporated to leave seven grams of extract.

The extract was dissolved in 230 milliliters of benzene and fractionated over a column of 300 grams of alumina (acid washed, dried at 120 degrees centigrade) using 230-milliliter portions of developing solvent as shown in Table I.

TABLE I

| Fraction | Solvent | Eluate Solids, Milligrams |
|---|---|---|
| 1 | benzene | |
| 2 | do | 390 |
| 3 | benzene—5 percent ether | |
| 4 | do | 162 |
| 5 | benzene—10 percent ether | |
| 6 | do | 63 |
| 7 | benzene—30 percent ether | 81 |
| 8 | do | 490 |
| 9 | benzene—50 percent ether | 657 |
| 10 | do | 637 |
| 11 | ether | 429 |
| 12 | do | 217 |
| 13 | do | 121 |
| 14 | do | 93 |
| 15 | ether—5 percent chloroform | 118 |
| 16 | do | 111 |
| 17 | ether—15 percent chloroform | 101 |
| 18 | do | 119 |
| 19 | do | 102 |
| 20 | do | 88 |
| 21 | ether—50 percent chloroform | 69 |
| 22 | do | 60 |
| 23 | do | 49 |
| 24 | do | 47 |
| 25 | chloroform | 63 |
| 26 | do | 16 |
| 27 | chloroform—20 percent acetone | 195 |
| 28 | chloroform—50 percent acetone | 771 |
| 29 | acetone | 52 |
| 30 | methanol | 35 |

Eluate solids fractions 8 through 13 were combined to give 2.58 grams of residue which was triturated with ether, and the ether decanted, until the decanted washings were colorless. This left 1.4115 grams of 1,4-androstadiene-3,17-dione, having a melting point of 143 to 144.5 degrees centigrade, $[\alpha]_D^{23}$ of plus 115 degrees (CHCl$_3$), $$\lambda_{max.}^{alc.} \ 239.5 \ m\mu \ (E=12,500)$$

This compound is known to be useful in the production of estrone.

Eluate solids fractions 19 through 25 were combined and recrystallized twice from one milliliter of ethyl acetate to yield 0.3948 gram of 17β-hydroxy-1,4-androstadiene-3-one(1-dehydrotestosterone) having a melting point of 172 to 173 degrees centigrade, $[\alpha]_D^{23}$ of plus 23 degrees.

$$\lambda_{max.}^{alc.} \ 243 \ m\mu \ (E=16,000)$$

This compound is known to be useful in the production of estradiol.

Eluate solids fractions 27 through 30 were combined. The combined residues were dissolved in methylene chloride, slurried with ten grams of Celite diatomaceous earth and the solvent then evaporated. The diatomaceous earth bearing residue was packed onto the top of a column which was made in the following manner. A mixture of one volume of toluene, a volume of Skellysolve C normal heptanes boiling at 186 to 212 degrees Fahrenheit, 1.4 volumes of methanol and 0.6 volume of water was permitted to separate. The aqueous phase was then removed. A 150-milliliter portion of the aqueous phase was slurried with 100 grams of Celite diatomaceous earth and then the non-aqueous phase was added and the mixed slurry was poured into a column. The surplus non-aqueous phase was drained from the column. This column, topped with the diatomaceous earth-steroid residue was then eluted with thirteen 200-milliliter portions of the non-aqueous phase obtained above, 200 milliliters of methanol, and 200 milliliters of methylene chloride. Fractions 4 through 11 were 1-dehydrotestosterone. Fractions 14 and 15 were 1-dehydrotestololactone. The combined residue of fractions 14 and 15 was taken up in methanol, decolorized with activated carbon, evaporated and recrystallized from two milliliters of ethyl acetate to yield pure 1-dehydrotestololactone having a melting point of 221 to 223 degrees centigrade and characteristic infrared spectra and optical rotation.

EXAMPLE 2

*Progesterone*

The fermentation and extraction procedure of Example 1 was followed, except that at the time of the progesterone addition, forty milliliters of H$_3$PO$_4$ was added to acidify the beer from pH 7.3 to pH 2.15.

The total resulting extract of six grams was dissolved in benzene and chromatographed precisely as in Example 1.

Eluate solids fractions 8 through 16 (3.34 grams) were combined and triturated with ether to yield 1.94 grams of residue, namely 1,4-androstadiene-3,17-dione having a melting point of 143.5 to 144.5 degrees centigrade.

EXAMPLE 3

*17α,21-dihydroxy-4-pregnene-3,20-dione*

The fermentation and extraction procedure of Example 1 was followed, except that the steroid substrate progesterone was replaced by two grams of 17α,21-dihydroxy-4-pregnene-3,20-dione dissolved in 100 milliliters of methanol.

The extractives weighed three grams. The extractives were dissolved in 360 milliliters of ethylene dichloride and fractionated over a column of 240 grams of Florisil magnesium silicate with 360-milliliter portions of solvent as follows: ethylene dichloride, three portions; ethylene dichloride-acetone: 25:1 two portions; 15:1 three portions; 12:1 three portions; 10:1 three portions (fractions 12 to 14); 8:1 three portions (fractions 15 to 17); 5:1 three portions; 2:1 three portions; acetone, six portions; and methanol, three portions. Eluate solids fractions 12 through 17, weighing 0.8 gram, were combined and recrystallized three times from methanol-chloroform (1:1) to yield 400 milligrams of 17α,21-dihydroxy-1,4-pregnadiene-3,20-dione having a melting point of 238 to 242 degrees centigrade, $[\alpha]_D^{23}$ of plus 70 degrees (CHCl$_3$), $$\lambda_{max.}^{alc.} \ 245 \ m\mu \ (E=13,068)$$

EXAMPLE 4

*17α-hydroxyprogesterone*

Otherwise like Example 1, 17α-hydroxyprogesterone was used, in place of progesterone, to produce 1-dehydro-17α-hydroxyprogesterone as well as a fifty percent yield of 1-dehydrotestosterone.

EXAMPLE 5

*Allopregnane-3,11,20-trione*

Otherwise like Example 1, allopregnane-3,11,20-trione was used, in place of progesterone, to produce 5α-androst-1-ene-3,11,17-trione, having adrenocortical hormone activity, androgenic and estrogenic activity. A small amount contaminating pregnane-3,11,20-trione in the starting material resulted in 5β-androst-1-ene-3,11,17-trione, having uterotropic activity.

EXAMPLE 6

*11-desoxycorticosterone*

Following Example 1, using 11-desoxycorticosterone, in place of progesterone, produced 1-dehydro-11-desoxycorticosterone, 1-dehydrotestosterone, 1,4-androstadiene-3,17-dione, and 1-dehydrotestololactone.

EXAMPLE 7

*Androstenedione*

Following Example 1, using 4-androstene-3,17-dione, in place of progesterone, produced 1-dehydrotestosterone, 1,4 - androstadiene - 3,17 - dione, and 1 - dehydrotestololactone.

EXAMPLE 8

*Testosterone*

Following Example 1, using testosterone, in place of progesterone, produced mainly 1-dehydrotestosterone, and also 1,4-androstadiene-3,17-dione.

EXAMPLE 9

*Progesterone*

Septomyxa affinis was grown for eighteen hours in nutrient medium prepared as described in Example 1. The mycelium was centrifuged from the medium and washed six times by centrifugation with distilled water. The washed mycelium was suspended in 600 milliliters of distilled water and divided into six portions in 250-milliliter Erlenmeyer flasks. Additions were made as indicated in Table II, and forty milligrams of progesterone dissolved in one milliliter of acetone was added to each flask. The flasks were shake cultured at room temperature for 24 hours. Each whole beer was then extracted four times with 25-milliliter portions of methylene chloride. Each extract was then washed with two percent sodium bicarbonate solution and distilled water, dried over anhydrous sodium sulfate, and the solvent then evaporated. The residues were analyzed by paper chromatography with results as shown in Table II. The 1-dehydroprogesterone exhibits enhanced progestational activity.

In the same manner replacing the progesterone substrate by 19-normethyltestosterone in conjunction with thoroughly washed cells buffered at pH 7 produced 1-dehydro-19-normethyltestosterone which can be rearranged in acid to estradiol.

TABLE II

| pH | | Additives | Gamma isolate per 200 gamma extract | | | |
|---|---|---|---|---|---|---|
| Initial | Final | | 1-dehydro-progesterone | 1-dehydro-4-androstene-3,17-dione | 1-dehydro-testosterone | 1-dehydro-testololactone |
| 3.9 | 6.9 | ............ | ........ | 60 | 20 | 12 |
| 7.6 | 8.0 | $KH_2CO_3$ | ........ | 60 | 6 | 10 |
| 2.0 | 2.1 | $H_3PO_4$ | 75 | 2 | 6 | ........ |
| 3.9 | 3.9 | dextrose cerelose | 0 | 50 | 40 | 2 |
| 6.2 | 6.4 | $C_9CO_3$ + glucose | 3 | 50 | 40 | 2 |
| 5.8 | 7.0 | phosphate buffer | 2 | 60 | 30 | 15 |

EXAMPLE 10

11β,21-dihydroxy-4,17(20)-pregnadiene-3-one

Septomyxa affinis was maintained on malt agar slants composed of fifty grams of dry malt extract, five grams of Edamine enzymatic digest of lactalbumin, and twenty grams of agar diluted to one liter with tap water and adjusted to a pH between 6.5 to 7.0. Inoculum from the agar slant was transferred to one-liter Erlenmeyer flasks containing 100 milliliters of malt extract agar and incubated at room temperature for from four to seven days to produce spores. The spores were suspended in 100 milliliters of sterile one percent saline. Five milliliters of this saline spore inoculum was introduced into each of five 250-milliliter flasks containing 100 milliliters each of medium, as in Example 1, which was adjusted to pH 4.8 to 5.0. These were incubated for 48 to 72 hours with shaking at room temperature and then added to six liters of medium as in Example 1. This culture was maintained for 24 hours at room temperature with aeration at a rate of one liter per minute. This six liters of seed culture was then added to 100 liters of medium as in Example 1 and grown at room temperature for 24 hours with agitation and aeration at a rate of two liters per minute. To this 24-hour culture there was added 25 grams of 11β,21-dihydroxy-4,17(20)-pregnadiene-3-one dissolved in 500 milliliters of acetone. Agitation and aeration at the rate of one liter per minute was continued for 24 hours.

The broth was filtered to give mycelium and filtered beer. The mycelium was washed with twenty liters of water and the water washing was added to the filtered beer. The washed mycelium was suspended and slurried twice each time with twelve liters of acetone, and then suspended and slurried twice each time with twelve liters of methylene chloride. The thus obtained acetone and methylene chloride mycelium extracts were pooled and added to the extract obtained from four extractions of the filtered beer and water wash, each extraction being with 24 liters of methylene chloride. The extracts from the filtered beer and water wash and those from the mycelium were combined and washed twice each time with twelve liters of two percent sodium bicarbonate solution and then twice each time with twelve liters of water. The washed extract was concentrated in a still to give three liters of concentrate which was then evaporated to dryness on a steam bath in air to give 54.3 grams of crude crystalline residue. This residue was triturated six times, each time with 25 milliliters of diethyl ether. The remaining crystals weighing 20.9 grams were dissolved in 250 milliliters of hot methanol, filtered, and cooled to room temperature to give 11.7 grams of crystals melting at 181.5 to 183.5 degrees centigrade. A 305-milligram portion of these crystals was dissolved in six milliliters of boiling ethylene dichloride. The hot solution was filtered and crystallized at room temperature followed by chilling at about five degrees centigrade to complete crystallization. There was thus obtained 238 milligrams of crystals melting at 158 to 161 degrees centigrade. Recrystallization, by the same technique, produced 215 milligrams of 11β,21 - dihydroxy - 1,4,17(20) - pregnatriene - 3 - one having a melting point of 149 to 153 degrees centigrade. Acetylation of the 21-hydroxy group with acetic anhydride in pyridine is productive of 11β-hydroxy-21-acetoxy-1,4,17(20)-pregnatriene-3-one which is converted, with two molar equivalents of hydrogen peroxide in dry tertiary butyl alcohol preferably containing about a molar equivalent of pyridine and in the presence of a catalytic amount of osmium tetroxide, to 11β,17α-dihydroxy-21-acetoxy-1,4-pregnadiene-3,20-dione.

The 11.7 grams of crystals from methanol, having a melting point of 181.5 to 183.5, were 1 - methoxy - 11β,21-dihydroxy - 4,17(20) - pregnadiene - 3 - one produced from 11β,21 - dihydroxy - 1,4,17(20) - pregnatriene - 3-one by the action of hot methanol. Using less rigorous conditions or other solvents such as ethyl acetate is productive of 11β,21 - dihydroxy - 1,4,17(20) - pregnatriene-3 - one, the 1 - methoxy compound not being formed.

EXAMPLE 11

17α,21 - dihydroxy - 4 - pregnene - 3,11,20 - trione

Otherwise in accordance with both Examples 3 and 10, using 17α,21 - dihydroxy - 4 - pregnene - 3,11,20 - trione as steroid substrate produced 17α,21 - dihydroxy - 1,4-pregnadiene - 3,11,20 - trione, having anti-inflammatory and antiarthritic properties. Either the free product or 21-esters such as for example the 21-acetate or propionate is thus useful therapeutically.

EXAMPLE 12

11β,17α,21 - trihydroxy - 4 - pregnene - 3,20 - dione

Otherwise in accordance with both Examples 3 and 10, replacing the starting steroid substrate by 11β,17α,21 - trihydroxy - 4 - pregnene - 3,20 - dione produced 11β,17α,21-trihydroxy - 1,4 - pregnadiene - 3,20 - dione which in its free form or as the 21-esters such as the 21-acetate or 21-propionate demonstrated anti-inflammatory and antiarthritic properties qualitatively similar to those of hydrocortisone.

EXAMPLE 13

11 - ketoprogesterone

Otherwise like Example 1, substituting 11 - ketoprogesterone as the starting steroid substrate produced the anabolically active compounds 1-dehydroadrenosterone, 1 - dehydro - 11 - ketotestosterone and 1 - dehydro - 11-ketotestosterone and 1 - dehydro - 11 - ketoprogesterone, having glucocorticoid activity.

EXAMPLE 14

11α - hydroxyprogesterone

Otherwise like Example 1, substituting 11α - hydroxyprogesterone as the starting substrate produced the anabolically active compounds 1 - dehydro - 11α - hydroxytestosterone, 11α - hydroxy - 1,4 - androstadiene - 3,17-dione and 1 - dehydro - 11α - hydroxyprogesterone.

EXAMPLE 15

11β - hydroxyprogesterone

Otherwise like Example 1, substituting 11β - hydroxyprogesterone as the starting substrate produced the anabolically active compounds 1 - dehydro - 11β - hydroxytestosterone, 11β - hydroxy - 1,4 - androstadiene - 3,17-dione and 1 - dehydro - 11β - hydroxyprogesterone, having glucocorticoid activity.

EXAMPLE 16

19 - normethyltestosterone

Otherwise like Example 1, substituting 19 - normethyltestosterone as the starting steroid produced estrone and estradiol.

EXAMPLE 17

17α - methyltestosterone

Otherwise like Example 1, substituting 17α - methyltestosterone as the starting steroid produced 1 - dehydro-17α - methyltestosterone of enhanced anabolic activity.

EXAMPLE 18

Septomyxa species

Following the procedures of Examples 1 through 17 using Septomyxa aesculi, Septomyxa corni, Septomyxa salicina or Septomyxa tulasnei produced the same results as obtained with Septomyxa affinis.

EXAMPLE 19

6α - methylhydrocortisone

Otherwise like Example 1, 6α - methylhydrocortisone was used in place of progesterone to produce 1 - dehydro-6α - methylhydrocortisone.

It is to be understood that the invention is not to be limited to the exact details of operation or exact compounds shown and described, as obvious modifications and equivalents will be apparent to those skilled in the art, and the invention is therefore to be limited only by the scope of the appended claims.

We claim:

1. A process for the 1,2-dehydrogenation of a steroid which comprises contacting a viable fungus of the genus Septomyxa with a 3-oxygenated steroid in which the 1,2,3-position carbon atom group is selected from —CH$_2$—CH$_2$—CO—, —CH$_2$—CH$_2$—CHOH—, and —CH$_2$—CH(CH$_3$)—CO— under aerobic conditions.

2. A process for the 1,2-dehydrogenation of a steroid which comprises contacting a viable fungus of the genus Septomyxa with a 1,2-trihydro-3-oxygenated steroid under aerobic fermentation conditions.

3. A process for the 1,2-dehydrogenation of a steroid which comprises contacting a viable fungus of the genus Septomyxa with a 1,2-tetrahydro-3-oxygenated steroid under aerobic fermentation conditions.

4. A process for the 1,2-dehydrogenation of a steroid which comprises contacting Septomyxa affinis with a 3-oxygenated steroid in which the 1,2,3-position carbon atom group is selected from —CH$_2$—CH$_2$—CO—, —CH$_2$—CH$_2$—CHOH— and —CH$_2$—CH(CH$_3$)—CO— under aerobic conditions.

5. A process for the preparation of 1-dehydro steroids which comprises contacting a 4-dehydro-3-keto steroid selected from the pregnane series and the androstane series compounds containing a 1,2-trihydro linkage under aerobic fermentation conditions with a fungus of the genus Septomyxa in the presence of a nutrient medium.

6. A process for the 1,2-dehydrogenation of a 20-oxygenated steroid which comprises growing a fungus of the genus Septomyxa under aerobic conditions in the presence of a nutrient medium and a 20-oxygenated steroid saturated at the 1- and 2-carbon atoms until substantial 1,2-dehydrogenation has occurred.

7. A process for the 1,2-dehydrogenation of a 20-oxygenated steroid which comprises growing a fungus of the genus Septomyxa under aerobic conditions in the presence of a nutrient medium containing assimilable non-steroidal carbon and a 20-oxygenated steroid saturated at the 1- and 2-carbon atoms until substantial 1,2-dehydrogenation has occurred.

8. A process for the 1,2-dehydrogenation of a 20-keto steroid which comprises growing a fungus of the genus Septomyxa under aerobic conditions in the presence of a nutrient medium containing assimilable non-steroidal carbon and a 20-keto steroid saturated at the 1- and 2-carbon atoms until substantial 1,2-dehydrogenation has occurred.

9. A process for the 1,2-dehydrogenation of a steroid comprising growing a fungus of the genus Septomyxa under submerged aerobic agitated fermentation conditions in the presence of a 1,2-tetrahydro-3-oxygenated steroid and separating the resulting 1-dehydro-3-oxygenated steroid.

10. A process for the 1,2-dehydrogenation of a steroid comprising growing Septomyxa affinis under submerged aerobic agitated fermentation conditions in a nutrient medium containing a 1,2-tetrahydro-3-oxygenated steroid and separating the resulting 1-dehydro-3-oxygenated steroid.

11. The process of claim 10 wherein the nutrient medium contains assimilable non-steroidal carbon.

12. A process for the 1,2-dehydrogenation of a steroid comprising growing a fungus of the genus Septomyxa under submerged aerobic agitated fermentation conditions in the presence of a 1,2-tetrahydro-3-keto steroid and separating the resulting 1-dehydro-3-keto steroid.

13. A process for the 1,2-dehydrogenation of a steroid comprising growing a fungus of the genus Septomyxa under submerged aerobic agitated conditions in a medium containing a 1,2-tetrahydro-3-hydroxy steroid and separating the resulting 1-dehydro-3-oxygenated steroid.

14. A process comprising growing a fungus of the genus Septomyxa under aerobic conditions in a medium containing progesterone and separating the resulting 1,2-dehydro steroid.

15. A process comprising growing Septomyxa affinis under submerged aerobic agitated conditions in a medium containing carbohydrate and progesterone and separating the resulting 1,2-dehydro steroid.

16. A process comprising growing a fungus of the genus Septomyxa under aerobic conditions in a medium containing 11β,17α,21-trihydroxy-4-pregnene-3,20-dione and separating the resulting 1,2-dehydro steroid.

17. A process comprising growing Septomyxa affinis under submerged aerobic agitated conditions in a medium containing carbohydrate and 11β,17α,21-trihydroxy-4-pregnene-3,20-dione and separating the resulting 1,2-dehydro steroid.

18. A process comprising growing a fungus of the genus Septomyxa under aerobic conditions in a medium containing 11β,21-dihydroxy-4,17(20)-pregnadiene-3-one and separating the resulting 11β,21-dihydroxy 1,4,17(20)-pregnatiene-3-one.

19. A process comprising growing Septomyxa affinis under submerged aerobic agitated conditions in a medium containing carbohydrate and 11β,21-dihydroxy-4,17(20)-pregnadiene-3-one and separating the resulting 11β,21-dihydroxy-1,4,17(20)-pregnatiene-3-one.

20. A process comprising growing a fungus of the genus Septomyxa under aerobic conditions in a medium containing 17α-methyltestosterone and separating the resulting 1,2-dehydro product.

21. A process comprising growing Septomyxa affinis under submerged aerobic agitated conditions in a medium containing carbohydrate and 17α-methyltestosterone and separating the resulting 1,2-dehydro product.

22. A process comprising growing Septomyxa under aerobic agitated conditions with an allopregnane and separating the resulting 1,2-dehydro steroid.

23. A process comprising growing a fungus of the genus Septomyxa under aerobic conditions in a medium containing an allopregnane-3-one and separating the resulting 1,2-dehydro steroid.

24. A process comprising growing a fungus of the genus Septomyxa under aerobic conditions in a medium containing 11α-hydroxyallopregnane-3,20-dione and separating the resulting 1,2-dehydro steroid.

25. A process comprising growing *Septomyxa affinis* under submerged aerobic agitated conditions in a medium containing carbohydrate and 11α-hydroxyallopregnane-3,20-dione and separating the resulting 1,2-dehydro steroid.

26. A process for the production of 1-dehydro-6-methylhydrocortisone which comprises: growing a microorganism of the genus Septomyxa in a nutrient medium containing assimilable non-steroidal carbon, nitrogen and phosphorus, and 6-methylhydrocortisone, and recovering the thus-produced 1-dehydro-6-methylhydrocortisone.

References Cited in the file of this patent

Farlowia, vol. 4, December 1950, Quartermaster Culture Collection, page 46.

Kahnt et al.: Experientia, 8, 1952, pages 171, 172.

Finch et al.: Mfgr. Chemist, XXV, 6, June 1954, pages 248, 249.

Thom: Ann. New York Academy of Science, 60, 1 October 1954, pages 5, 24 and 26.

Ainsworth et al.: Jour. Gen. Microbiology, vol. 10, 1954, pages 465–474.